(12) United States Patent
Reger

(10) Patent No.: US 7,860,614 B1
(45) Date of Patent: Dec. 28, 2010

(54) TRAINER FOR ROBOTIC VEHICLE

(75) Inventor: Bernard D. Reger, West Orange, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1143 days.

(21) Appl. No.: 11/530,509

(22) Filed: Sep. 11, 2006

Related U.S. Application Data

(60) Provisional application No. 60/596,277, filed on Sep. 13, 2005.

(51) Int. Cl.
*G05B 19/04* (2006.01)
*G05B 15/00* (2006.01)
*G05B 19/00* (2006.01)
*G05B 19/42* (2006.01)

(52) U.S. Cl. .............. 700/264; 700/245; 700/246; 700/247; 700/250; 700/258; 700/9; 700/10; 700/47; 700/83; 700/84; 700/85; 700/86; 700/87; 700/88; 700/89; 901/1; 901/3; 901/4; 901/5; 901/6

(58) Field of Classification Search .......... 700/1, 700/245, 246, 247, 250, 258, 9, 10, 47, 83, 700/84, 85, 87, 86, 88, 89, 264; 901/1, 3, 901/4, 5, 6
See application file for complete search history.

(56) References Cited

U.S. PATENT DOCUMENTS

| | | | |
|---|---|---|---|
| 4,837,734 A * | 6/1989 | Ichikawa et al. | 700/249 |
| 5,465,525 A * | 11/1995 | Mifune et al. | 43/132.1 |
| 6,113,343 A * | 9/2000 | Goldenberg et al. | 414/729 |
| 6,484,083 B1 * | 11/2002 | Hayward et al. | 701/50 |
| 6,488,306 B1 * | 12/2002 | Shirey et al. | 280/474 |
| 6,533,584 B1 * | 3/2003 | Jenkins et al. | 434/236 |
| 6,705,871 B1 * | 3/2004 | Bevirt et al. | 434/262 |
| 6,720,949 B1 * | 4/2004 | Pryor et al. | 345/158 |
| 6,793,026 B1 * | 9/2004 | De Fazio | 180/8.3 |
| 6,889,118 B2 * | 5/2005 | Murray et al. | 700/250 |
| 6,925,357 B2 * | 8/2005 | Wang et al. | 700/245 |
| 7,011,171 B1 * | 3/2006 | Poulter | 180/8.2 |
| 7,042,440 B2 * | 5/2006 | Pryor et al. | 345/158 |
| 7,047,861 B2 * | 5/2006 | Solomon | 89/1.11 |
| 7,114,555 B2 * | 10/2006 | Patel et al. | 165/247 |
| 7,117,067 B2 * | 10/2006 | McLurkin et al. | 700/245 |
| 7,144,057 B1 * | 12/2006 | Young et al. | 296/24.3 |
| 7,158,859 B2 * | 1/2007 | Wang et al. | 700/245 |
| 7,158,860 B2 * | 1/2007 | Wang et al. | 700/245 |
| 7,164,970 B2 * | 1/2007 | Wang et al. | 700/245 |
| 7,218,993 B2 * | 5/2007 | Yasukawa et al. | 700/245 |
| 7,228,203 B2 * | 6/2007 | Koselka et al. | 700/245 |

(Continued)

*Primary Examiner*—Khoi Tran
*Assistant Examiner*—Ian Jen
(74) *Attorney, Agent, or Firm*—Michael C. Sachs

(57) ABSTRACT

A trainer for training a human to use a physical robot in a physical environment, the physical robot being controlled in the physical environment by an operator control unit, the trainer comprising an input device; a visual display; a computer connected to the input device and the visual display; and computer software disposed in the computer for creating a virtual robot and a virtual environment on the visual display, the virtual robot and the virtual environment being simulations of the physical robot and the physical environment wherein interaction between the virtual robot and the virtual environment simulates interaction between the physical robot and the physical environment.

6 Claims, 5 Drawing Sheets

U.S. PATENT DOCUMENTS

| | | | | |
|---|---|---|---|---|
| 7,310,570 | B2* | 12/2007 | Wang et al. | 700/245 |
| 7,346,429 | B2* | 3/2008 | Goldenberg et al. | 700/245 |
| 7,380,627 | B2* | 6/2008 | Huang et al. | 180/167 |
| 7,415,321 | B2* | 8/2008 | Okazaki et al. | 700/245 |
| 7,424,341 | B2* | 9/2008 | Watanabe et al. | 700/245 |
| 7,424,342 | B2* | 9/2008 | Beniyama et al. | 700/245 |
| 7,515,990 | B2* | 4/2009 | Sato et al. | 700/245 |
| 7,584,045 | B2* | 9/2009 | Peretz | 701/117 |
| 7,597,162 | B2* | 10/2009 | Won | 180/9.32 |
| 2002/0036617 | A1* | 3/2002 | Pryor | 345/156 |
| 2002/0147528 | A1* | 10/2002 | Watanabe et al. | 700/245 |
| 2003/0109780 | A1* | 6/2003 | Coste-Maniere et al. | 600/407 |
| 2004/0030571 | A1* | 2/2004 | Solomon | 705/1 |
| 2004/0046736 | A1* | 3/2004 | Pryor et al. | 345/156 |
| 2004/0254648 | A1* | 12/2004 | Johnson et al. | 700/1 |
| 2005/0021187 | A1* | 1/2005 | Wang et al. | 700/259 |
| 2005/0228541 | A1* | 10/2005 | Sehnert | 700/245 |
| 2005/0240310 | A1* | 10/2005 | Wang et al. | 700/245 |
| 2005/0267638 | A1* | 12/2005 | Peshkin et al. | 700/264 |
| 2005/0288802 | A1* | 12/2005 | Yamada | 700/83 |
| 2006/0047361 | A1* | 3/2006 | Sato et al. | 700/245 |
| 2006/0095161 | A1* | 5/2006 | Olson | 700/259 |
| 2006/0161303 | A1* | 7/2006 | Wang et al. | 700/259 |
| 2006/0161405 | A1* | 7/2006 | Munirajan | 703/6 |
| 2006/0184272 | A1* | 8/2006 | Okazaki et al. | 700/245 |
| 2006/0259193 | A1* | 11/2006 | Wang et al. | 700/245 |
| 2006/0293787 | A1* | 12/2006 | Kanda et al. | 700/245 |
| 2009/0044761 | A1* | 2/2009 | Chapin et al. | 119/720 |
| 2009/0287363 | A1* | 11/2009 | Young | 701/2 |

* cited by examiner

TRAINER FOR ROBOTIC VEHICLE

CROSS-REFERENCE TO RELATED APPLICATIONS

This application claims the benefit under 35 USC 119(e) of U.S. provisional patent application 60/596,277 filed on Sep. 13, 2005, which is hereby incorporated by reference.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to robotic vehicles and in particular to training humans to operate robotic vehicles. One use for the robotic vehicle is for the safe removal and/or detonation of unknown explosive devices.

SUMMARY OF THE INVENTION

It is an object of the invention to provide a trainer for training human beings to use and operate a robot.

It is another object of the invention to provide a trainer that includes a computer simulation of a robot.

It is a further object of the invention to provide a trainer that can simulate a robot interacting with its environment.

Another object of the invention is to provide a trainer for training human beings to dispose of explosive devices using a robot.

One aspect of the invention is a trainer for training a human to use a physical robot in a physical environment, the physical robot being controlled in the physical environment by an operator control unit, the trainer comprising an input device; a visual display; a computer connected to the input device and the visual display; and computer software disposed in the computer for creating a virtual robot and a virtual environment on the visual display, the virtual robot and the virtual environment being simulations of the physical robot and the physical environment wherein interaction between the virtual robot and the virtual environment simulates interaction between the physical robot and the physical environment.

Preferably, the input device is a virtual operator control unit that is substantially the same as the operator control unit in appearance and function. The physical robot may be a mobile vehicle and the virtual robot may be a simulation of the mobile vehicle. The physical robot may be one of a tracked vehicle and a wheeled vehicle and the virtual robot may be a simulation of one of the tracked vehicle and the wheeled vehicle, respectively.

Preferably, the physical robot includes a segmented arm and at least one camera and the virtual robot simulates the segmented arm and the at least one camera. The computer software may include a training application having a graphical user interface. The training application may include a simulation of explosive disposal methods wherein the virtual robot interacts with the virtual environment. The interactions between the virtual robot and the virtual environment are substantially in accord with Newtonian physics.

Another aspect of the invention is a method of training a human being to use a physical robot in a physical environment, the physical robot being controlled in the physical environment by an operator control unit, the method comprising providing a trainer having an input device; a visual display; and a computer connected to the input device and the visual display; loading the computer with computer software for creating a virtual robot and a virtual environment on the visual display, the virtual robot and the virtual environment being simulations of the physical robot and the physical environment wherein interaction between the virtual robot and the virtual environment simulates interaction between the physical robot and the physical environment.

Preferably, the input device is a virtual operator control unit that is substantially the same as the operator control unit in appearance and function.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The invention is a training method and apparatus for teaching human beings to use and operate robots. In one embodiment of the invention, the training apparatus and method is for teaching human beings to properly dispose of improvised explosive devices (IEDs) using a robot. Trainees may include military and civilian bomb disposal units, among others.

The robots are mobile, lightweight, electro-mechanical vehicles that may be tracked or wheeled. The robot includes at least one segmented, movable arm and at least one camera. The robot includes an operator control unit (OCU) that communicates with the robot wirelessly or through a cable. The robot may also include one or more weapon systems. While many different types of robots may be used, two examples of suitable robots are Foster-Miller's TALON robot and iRobot's PACKBOT.

Figure 1:
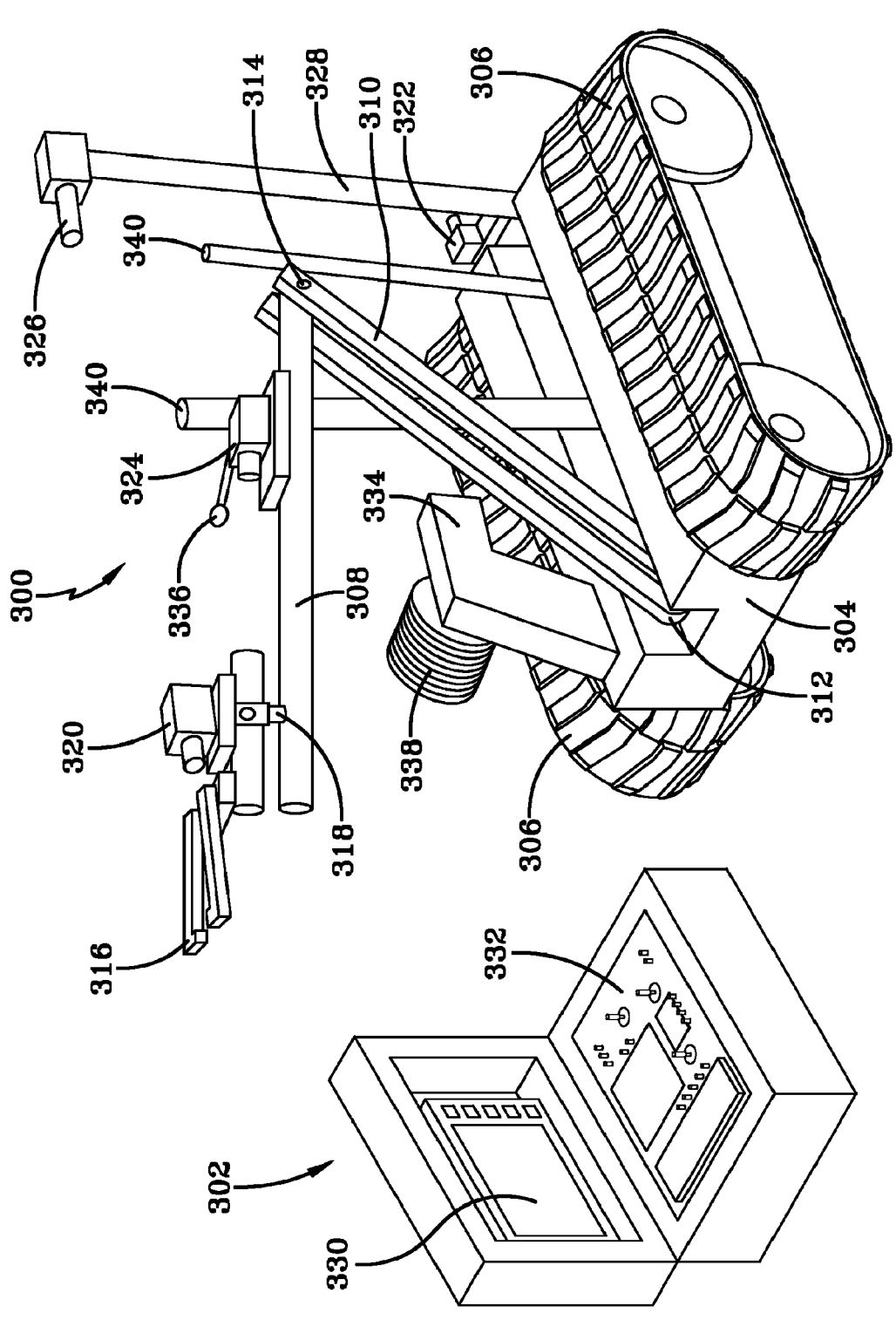
FIG. 1 is a perspective view of an exemplary robot and operator control unit.

FIG. 1 is a perspective view of a known, exemplary TALON robot 300 and its OCU 302. OCU 302 communicates with robot 300 either wirelessly or through a cable connection. Robot 300 includes a mobile chassis or platform 304 equipped with tracks 306 (wheeled robots may also be used). A segmented arm includes an upper arm 308 and a lower arm 310. Lower arm 310 is connected to chassis 304 via a motorized hinge 312. Lower arm 310 is connected to upper arm 308 via elbow 314 that comprises a motorized hinge. A gripper 316 may be connected to upper arm 308 via a wrist 318 that comprises a rotating joint.

Various cameras may be provided, such as a gripper camera 320, a rear facing camera 322, an elbow camera 324 and a zoom camera 326 mounted on mast 328. Each camera may included a pan and/or tilt mechanism for panning and tilting. A speaker 338, microphone 336, antennae 340 and fiber optic cable spool 338 may also be provided. The OCU 302 includes a visual display 330 that corresponds to one or more camera views and a control panel 332.

Figure 2:
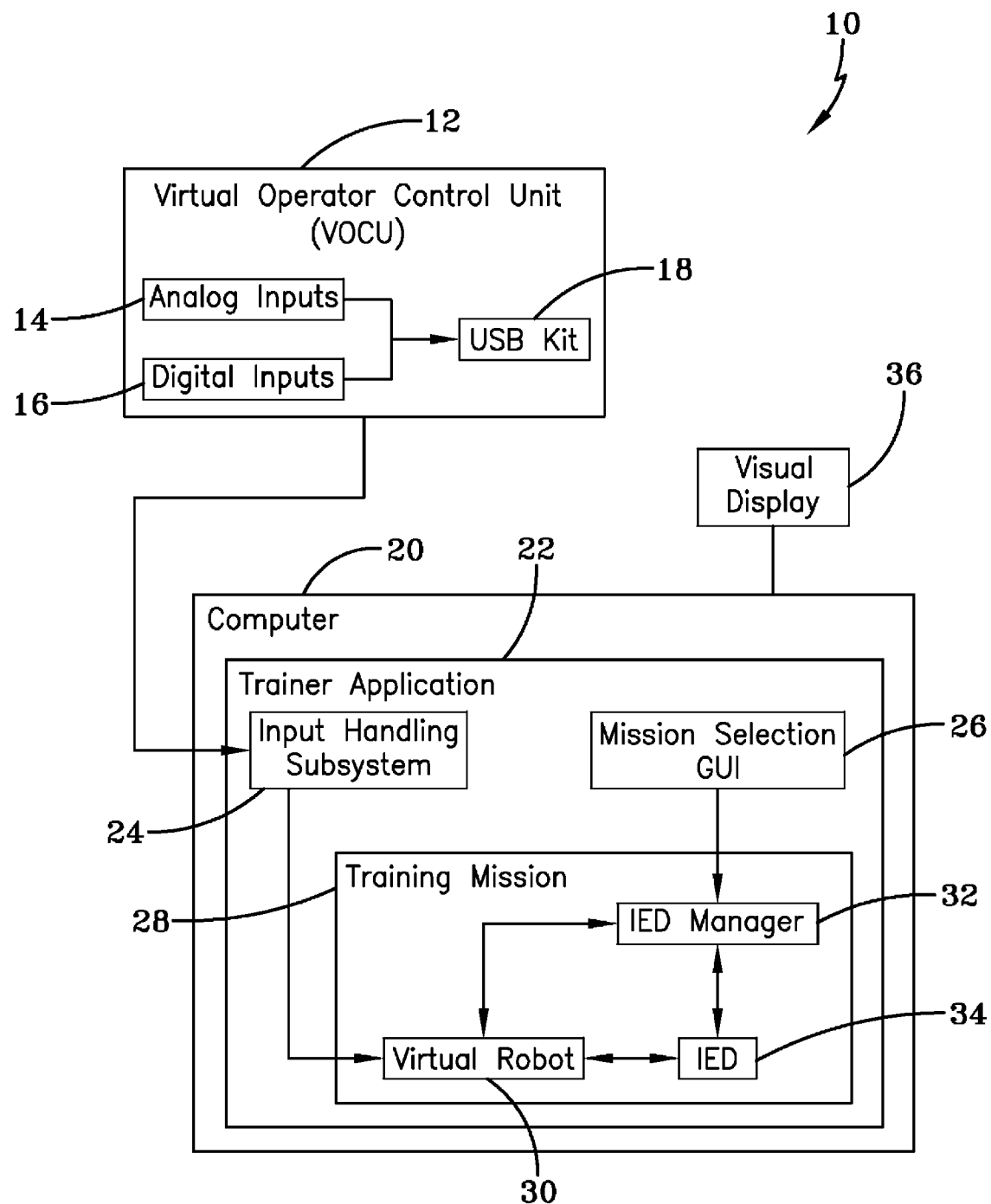
FIG. 2 is a schematic diagram of one embodiment of a trainer.

The inventive trainer is a combination of software and hardware. FIG. 2 is a schematic diagram of one embodiment of a trainer 10. The trainer 10 includes a computer 20 with an input device 12 and a visual display 36. The trainer 10 provides a computer simulation of an actual robot, such as the robot 300. For the purposes of this patent, an actual, physical robot, such as the TALON robot 300, is referred to as the "physical robot" and the computerized simulation of the physical robot is referred to as the "virtual robot." The real world surroundings of the physical robot is the "physical' environment and the computerized simulation of the physical environment is the "virtual environment." When loaded in the computer 20, the trainer software provides visual images of the virtual robot and the virtual environment that simulate the physical robot and the physical environment. In addition, the software provides for interactions between the virtual robot and the virtual environment that simulate interactions between the physical robot and the physical environment.

The input device may be a conventional computer keyboard or a joystick apparatus. It is preferred that the trainer 10 simulate the physical robot 300 as much as possible. Therefore, the input device should be as similar to the OCU 302 as possible. This is accomplished by using a "virtual operator control unit" (VOCU) 12 as the input device for the trainer 10. The VOCU 12 is an actual, physical apparatus used by the trainee to control the virtual robot. The VOCU 12 imitates the appearance and functionality of the OCU 302. Thus, it is preferred that the VOCU 12 be packaged in a container having the same size and appearance as the OCU 302 (FIG. 1). Also, the visual display 36 should be located in the container for the VOCU 12, as is the case for the OCU 302.

Figure 3:
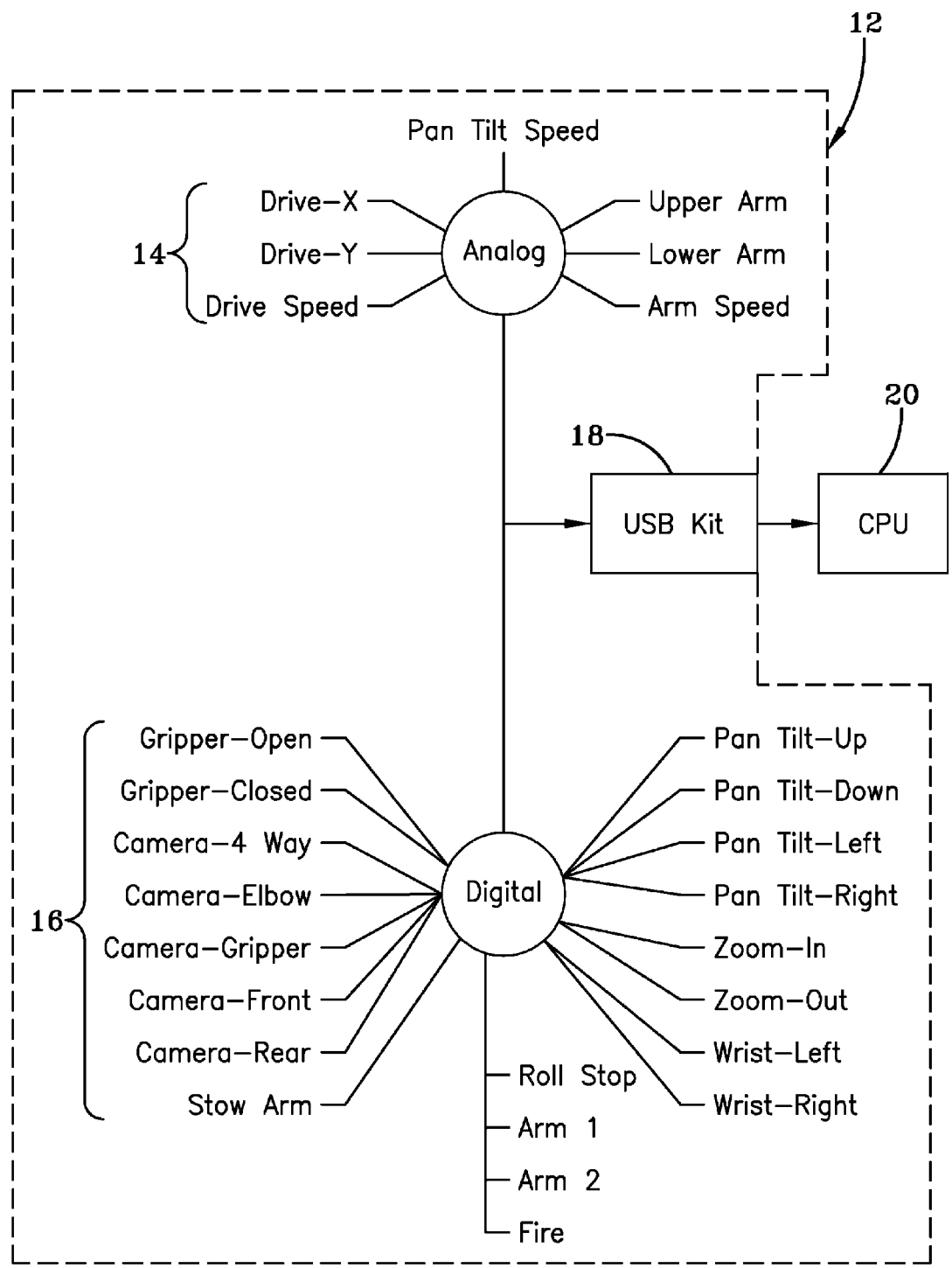
FIG. 3 is a schematic diagram of one embodiment of a virtual operator control unit.

The VOCU 12 may be constructed using controls (buttons, switches, etc.) that are identical to those of the OCU 302. The controls of the VOCU 12 are connected via a USB kit to the trainer computer's USB port. The VOCU 12 appears on the visual display 36 as a multi-axis, multi-button joystick. The joystick's inputs are accessed by the computer software. The external appearance of the control panel for the VOCU 12 is virtually identical to the appearance of the control panel 332 of the OCU 302. The various controls on the OCU 302 are duplicated on the VOCU 12. As shown in FIGS. 2 and 3, the VOCU 12 has analog inputs 14, digital inputs 16 and a USB kit 18. The VOCU 12 is cabled to the computer 20. The analog and digital inputs may be adjusted by various known control devices, such as joysticks, toggle switches, rotary dials, etc.

FIG. 3 is a schematic diagram of one embodiment of a VOCU 12. The controls shown in FIG. 3 will be discussed in conjunction with the robot 300 (FIG. 1). It should be understood that robot 300 and VOCU 12 are merely exemplary of a robot and a virtual operator control unit. Robots with more features, less features and/or different features may also be used. The analog controls (FIG. 3) are: 1) Drive-Y for moving the robot 300 forward or reverse; 2) Drive-X for moving the robot 300 to the left or right; 3) Drive Speed for adjusting the Drive-X and Drive-Y speeds; 4) Upper Arm for activating the motorized hinge at elbow 314; 5) Lower Arm for activating the motorized hinge 312; 6) Arm Speed for adjusting the Upper Arm and Lower Arm speeds; and 7) Pan Tilt Speed for controlling the speed of the pan tilt mechanism for camera 326.

The digital controls are: 1) Gripper-Open for opening gripper 316; 2) Gripper-Close for closing gripper 316; 3) Camera-4 Way provides a four way split video display showing views from all four cameras 320, 322, 324 and 326 simultaneously; 4) Camera-Elbow, Camera-Gripper, Camera-Front, Camera-Rear changes the video display to the selected camera view; 5) Stow Arm stows the segmented arm 308, 310; 6) Pan Tilt-Up, Down, Left and Right moves camera 326; 7) Zoom-In, Out controls the lens of camera 326; 8) Wrist-Left, Right controls the rotation of wrist 318; 9) Roll Stop provides an emergency brake; 10) Fire activates an electronic circuit capable of remotely initiating events; 11) Arm 1 and Arm 2 are safety switches to ensure the intent to activate the firing circuit.

Referring again to FIG. 2, computer 20 is loaded with a training application (software) 22. Training application 22 includes an input handling subsystem 24, a mission selection graphical user interface (GUI) 26 and one or more training missions 28 selected from the GUI 26. In one embodiment of the invention, the training application 22 is designed for IED handling and the training mission 28 includes the virtual robot 30, an IED manager 32 and one or more IEDs 34. Personnel are trained in the disposal of IEDs 34 using the virtual robot 30 to locate the IED 34 and properly place an explosive charge, such as C4, on or near the IED 34.

Figure 4:
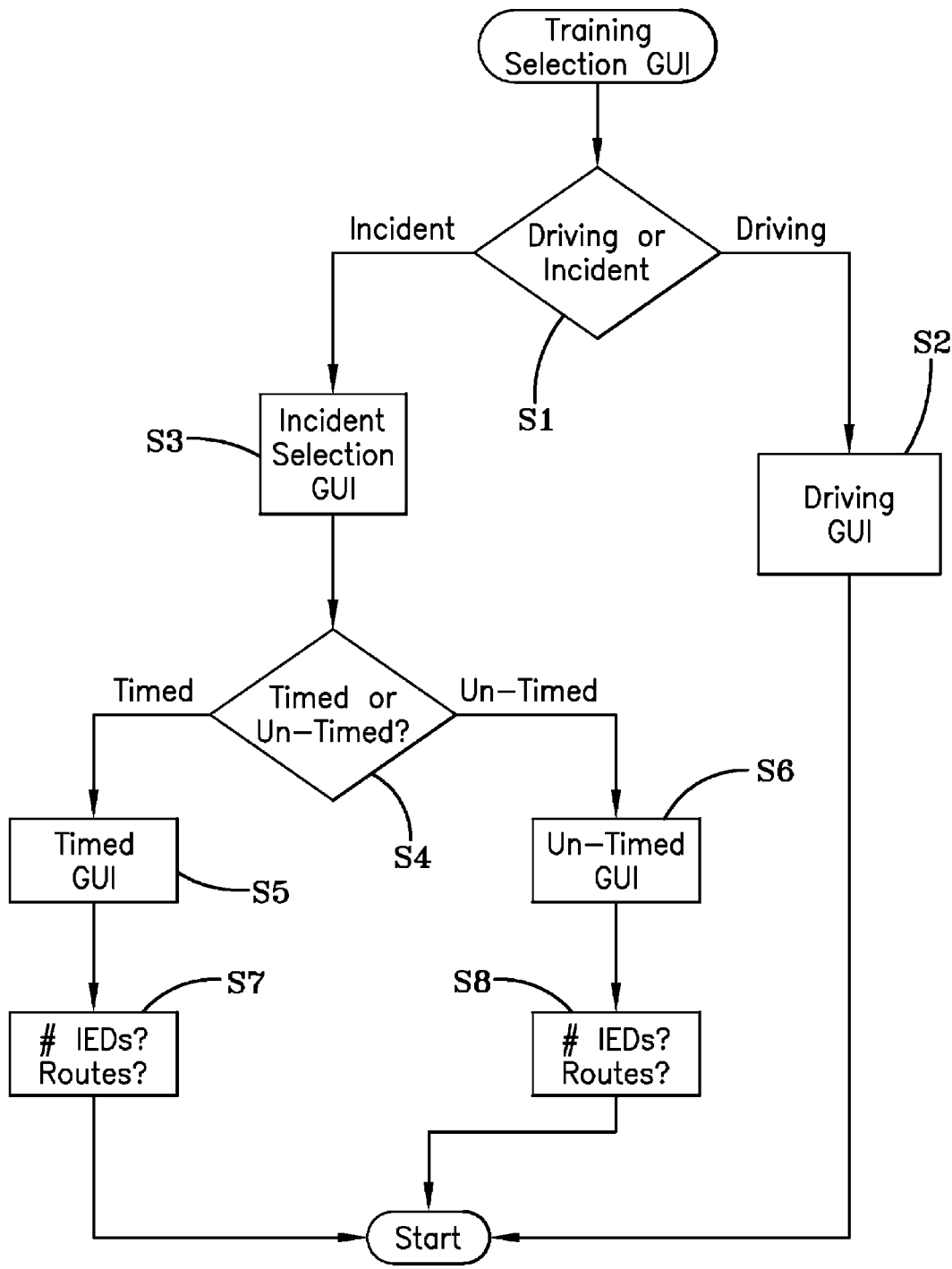
FIG. 4 is a flow chart for a graphical user interface.

In one embodiment of a trainer application 22 for training bomb disposal personnel, the trainer begins by presenting the trainee with a GUI 26. The GUI 26 guides the trainee through the process of selecting the desired training. FIG. 4 is a flow chart of the GUI 26. At the first screen S1, she can choose either a driving training (no IEDs) S2 or incident training S3 (IEDs). If she selects driving training S2, she is presented a second display that provides a briefing of the mission environment before the start of the mission. The driving training mission does not involve IEDs. Driving training teaches operation of the robot controls by providing, for example, a road to follow.

If incident training S3 is selected, the trainee is presented a display S4 asking her to choose between timed or un-timed incident training. If timed incident training S5 is selected, she is presented another display S7 requiring two inputs: 1) a number of IEDs to be disabled; and 2) a selection of training routes. After she inputs the required information, another display provides a mission briefing before starting the mission.

If untimed incident training S6 is selected, she is presented another display S8 requiring two inputs: 1) a number of IEDs to be disabled; and 2) a selection of training routes. After she inputs the required information, another display provides a mission briefing before starting the mission. On the final three screens presented to the trainee in each mission (driving training, timed incident training and untimed incident training), there is a deploy button that starts the mission. Upon clicking the deploy button, data is collected and sent to the mission. The collected and sent data includes 1) whether the mission is driving or incident training; 2) if incident training, whether it is timed or untimed; 3) if incident training, the number of IEDs to randomly place; and 4) if incident training, the routes to use for training.

In one embodiment of a training application, there are four types of IEDs, although more or less types of IEDs may be used. The four types are: 1) standard; 2) timed; 3) movable; and 4) daisy chain (sympathetic detonation). To dispose of a standard IED, the trainee places an active explosive within the standard IED's sensitive radius. The active explosive may be, for example, C4.

A timed IED includes a timer controller that is located nearby. To dispose of a timed IED, the trainee may dispose of either the timer controller or the timed IED itself. To dispose of either the timer controller or the timed IED, the trainee must place C4 within that object's sensitive radius.

Daisy chain IEDs, designed for sympathetic detonation, are newer threats to soldiers. Daisy chain IEDs include a single daisy chain controller. The key to removal is to destroy the daisy chain controller first. Once the daisy chain controller is destroyed, the daisy chain IED is considered safe. If a daisy chain IED is destroyed by C4 before the daisy chain controller is destroyed, all the daisy chain IEDs connected to and controlled by the daisy chain controller will detonate.

During an incident training mission, a trainee will fail if any of the following conditions occur: 1) The virtual robot is within the damage radius of C4 when it detonates. 2) The virtual robot is within the damage radius of an IED when it detonates. 3) The timer controller on a timed IED expires and the IED detonates before being rendered safe. 4) A daisy chain IED that is connected to a daisy chain controller is destroyed before the daisy chain controller is destroyed. 5) A movable IED is destroyed outside of a Disposal Area. If the trainee disposes of all IEDs located in the mission environment without failing (see above conditions), she passes the mission.

As mentioned before, in driving training there are no IEDs. In timed or untimed incident training, the mission environment consists of regions. A region is either a Route (road) or a Disposal Area. Along the routes are a plurality of IED candidate positions. The IED candidate positions represent all the locations where an IED may appear. There is no limit to the number of IED candidate positions that can be placed in the mission environment. A class named "IED Manager" manages the IEDs.

Figure 5:
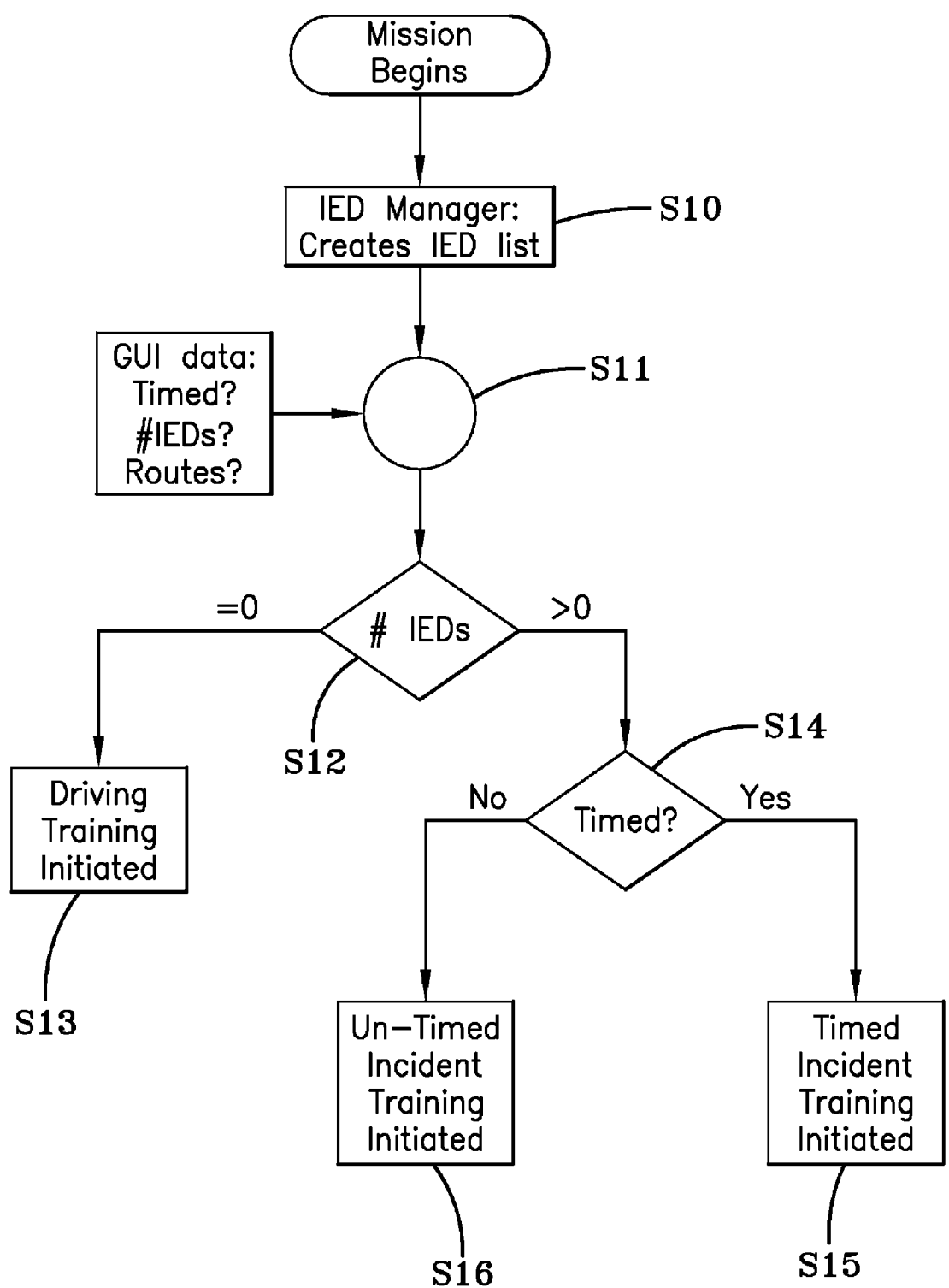
FIG. 5 is a flow chart for the IED Manager.

FIG. 5 is a flow chart for the IED Manager 32 (See FIG. 2 also). In step S10, the IED Manager creates a list of all the IED candidate locations. The list indicates the region in which the IED is located, if the IED has the capability of being timed, and if the IED is controlled by a simple timer controller (one IED per controller) or a daisy chain timer controller (multiple IEDs per controller).

In step S11, the IED Manager receives the data collected by the GUI. In step S12, the IED Manager examines the number of IEDs chosen. If zero IEDs are chosen, then the mission is a driving training mission and the IED Manager proceeds to S13. In a driving training mission, all IED candidate positions are ignored and no IEDs are physically placed in the mission.

If the number of IEDs is other than zero, then the mission is an incident training mission and the IED Manager proceeds to S14. At S14, the IED Manager examines whether the incident training mission is timed or untimed. If a timed incident training mission is requested, the IED Manager proceeds to S15. At S15, the IED Manager reviews the list of IEDs and selects from it the number of timer controlled IEDs selected by the trainee on the route or routes selected by the trainee. These IEDs and their controllers are then physically placed into the mission environment. The timers are set depending on the number of IEDs chosen and their locations.

If an untimed training mission is requested, the IED Manager proceeds to S16. At S16, the IED Manager reviews the list of IEDs and selects from it the number of IEDs selected by the trainee on the route or routes selected by the trainee. These IEDs are then physically placed into the mission. If a timer controlled IED is selected, the timer is disabled and the timer controller is not physically placed. Finally, the mission is started.

The IED Manager ensures that every time a trainee starts a mission, the IEDs will rarely be in the same place twice. This randomness helps to keep the trainee interested and prevents her from "committing the solution to memory" thereby reinforcing the process required for success and survival.

Computer Software

The trainer software may be designed for any computer or game system platform including, but not limited to, Macintosh, UNIX, Linux, Windows, Xbox, etc. A useful starting point is Epic's Unreal Game Engine 2.5. The Unreal Game Engine has a class of vehicles called "TreadCraft." "TreadCraft" may be used to create the virtual chassis or platform 304 (FIG. 1). For training purposes, it is important that the interaction of the virtual robot and the virtual environment simulate as closely as possible the interaction of the physical robot and the physical environment.

To enable the virtual robot to interact with the virtual environment, the Unreal physics engine called "Karma" may be used. The Karma physics engine is a rigid-body physics engine developed by MathEngine. It provides physics modeling, rigid-body dynamics with constraints and collision detection. Using a variety of computational strategies to simplify, speed up, and exclude non-interacting objects, it achieves animation level speed without sacrificing physical fidelity. Each simulated object has its own mass and inertia, obeys Newton's laws of motion, and interacts with other objects according to mass, inertia, friction, restitution, and gravity. Every object has kinematic attributes that describe its position and movement, such as: position of the center of mass, orientation of the body, acceleration/velocity of the center of mass and angular acceleration/velocity, which describes the change of orientation. Forces and torques are the dynamic attributes used in Karma.

In the inventive trainer, virtual components that are attached to the virtual chassis, such as the segmented arm and cameras, are "Karma Actors" and can interact with the virtual environment. Virtual components are attached to the virtual chassis with a "Karma Hinge." A Karma Hinge may be controlled as a simple one-degree of freedom (DOF) spring-loaded hinge or a motorized hinge. By connecting virtual components (Karma Actors) to the virtual chassis using Karma Hinges, interactions of the virtual robot and the virtual environment are substantially in accord with Newtonian or classical physics.

For example, the physical robot's segmented arm comprises a lower arm 310 (FIG. 1) connected to the chassis 304 with motorized hinge 312, and an upper arm 308 connected to the lower arm 310 via motorized hinge 314. The gripper 316 is connected to the upper arm 308 via the rotatable wrist 318. In the virtual robot, the lower arm is a Karma Actor connected to the chassis with a Karma Hinge. The upper arm is a Karma Actor connected to the lower arm with a Karma Hinge. The gripper is a Karma Actor connected to the upper arm with a Karma Hinge. Each of the Karma Actors in the chain of components is able to interact realistically with the virtual environment. By using the Karma Actors and Karma Hinges, the virtual creations obey the Newtonian laws of physics. For example, if the virtual robot encounters a wall, the arm will strike the wall stopping the robot, rather than continuing through the wall as if it were not there. The simulation of Newtonian physics is important to the success of the trainer.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A trainer device for training a human to use a physical robot in a physical environment, said physical robot including a segmented arm and at least one camera and being controlled in the physical environment by a physical operator control unit, and said trainer device including a virtual operator control unit that is substantially the same as the physical operator control unit in appearance and function;

a visual display;

a computer connected to the virtual operator control unit and the visual display; and computer software disposed in the computer wherein the computer software includes a training application having a graphical user interface for creating a virtual robot and a virtual environment on the visual display, the virtual robot simulating the segmented arm and the at least one camera, wherein the virtual robot and the virtual environment become simulations of the physical robot and the physical environment, and wherein interaction between the virtual robot and the virtual environment simulates interaction between the physical robot and the physical environment substantially in accord with Newtonian physics, and wherein the training application includes a simulation of explosive disposal methods wherein the virtual robot interacts with the virtual environment wherein the simulation includes one of timed and un-timed incident training.

2. A trainer device for training a human to use a physical robot in a physical environment, said physical robot including a segmented arm and at least one camera and being controlled in the physical environment by a physical operator control unit, and said trainer device including a virtual operator control unit that is substantially the same as the physical operator control unit in appearance and function;

a visual display;

a computer connected to the virtual operator control unit and the visual display; and computer software disposed in the computer wherein the computer software includes a training application having a graphical user interface for creating a virtual robot and a virtual environment on the visual display, the virtual robot additionally simulating the segmented arm and the at least one camera, wherein the virtual robot and the virtual environment become simulations of the physical robot and the physical environment, and wherein interaction between the virtual robot and the virtual environment simulates interaction between the physical robot and the physical environment substantially in accord with Newtonian physics, and wherein the training application includes a simulation of explosive disposal methods wherein the virtual robot interacts with the virtual environment, wherein the simulation includes explosive disposal methods for IEDs, at least one of standard IEDs, timed IEDs, movable IEDs and daisy chain IEDs.

3. The trainer device of claim 2 wherein the training application includes an IED Manager for managing the IEDs.

4. The trainer device of claim 2 wherein the computer software includes Karma physics.

5. The trainer device of claim 4 wherein the virtual robot comprises a chassis and components connected to the chassis, the chassis and the components comprising Karma Actors and connections between the Karma Actors comprising Karma Hinges.

6. The trainer device of claim 2 wherein the physical robot is one of a mobile tracked vehicle and a mobile wheeled vehicle and the virtual robot simulates one of the mobile tracked vehicle and the mobile wheeled vehicle, respectively.

* * * * *